United States Patent
Gunda et al.

(10) Patent No.: US 8,495,026 B1
(45) Date of Patent: Jul. 23, 2013

(54) SYSTEMS AND METHODS FOR MIGRATING ARCHIVED FILES

(75) Inventors: Laxmikant Gunda, Pune (IN); Manoj Chaudhari, Pune (IN)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 13/285,085

(22) Filed: Oct. 31, 2011

(51) Int. Cl.
*G06F 17/30* (2006.01)
*G06F 7/00* (2006.01)

(52) U.S. Cl.
USPC ........................................................ 707/661

(58) Field of Classification Search
USPC ........................................................ 707/661
See application file for complete search history.

(56) References Cited

U.S. PATENT DOCUMENTS

| | | | | |
|---|---|---|---|---|
| 6,587,217 B1* | 7/2003 | Lahey et al. | ............... | 358/1.15 |
| 7,861,049 B2* | 12/2010 | Otani et al. | ............... | 711/162 |
| 8,078,583 B2* | 12/2011 | Prahlad et al. | ............... | 707/651 |
| 2004/0093361 A1* | 5/2004 | Therrien et al. | ............... | 707/204 |
| 2009/0094424 A1* | 4/2009 | Bondurant et al. | ............... | 711/161 |
| 2011/0184914 A1* | 7/2011 | Gong | ............... | 707/661 |
| 2011/0282841 A1* | 11/2011 | Saika et al. | ............... | 707/649 |

OTHER PUBLICATIONS

Laxmikant Gunda, Systems and Methods for Deduplicating Archived Data; U.S. Appl. No. 13/285,076, filed Oct. 31, 2011.

\* cited by examiner

*Primary Examiner* — Kuen Lu
(74) *Attorney, Agent, or Firm* — ALG Intellecutal Property, LLC

(57) ABSTRACT

A computer-implemented method for migrating archived files may include (1) identifying a file system including a plurality of placeholder files that reference corresponding archived files stored on a first archival system, (2) identifying a request to migrate the archived files from the first archival system to a second archival system, (3) making the second archival system available to the file system for archival, and, while both the first archival system and the second archival system are available to the file system, (4) locating each placeholder file within the plurality of placeholder files on the file system, and, for each located placeholder file, (5) retrieving a corresponding archived file from the first archival system, and (6) archiving the corresponding archived file on the second archival system. Various other methods, systems, and computer-readable media are also disclosed.

20 Claims, 6 Drawing Sheets

SYSTEMS AND METHODS FOR MIGRATING ARCHIVED FILES

BACKGROUND

In the digital age, organizations may store, manage, and access ever increasing volumes of data. Different types of data may have different access requirements—for example, important and/or frequently used data may require low-latency access provided by local, costly storage devices, while less important or rarely used data may not. In order to optimize usage of storage devices, some organizations may use an archiving system. An archiving system may archive a file by moving the file to an archive storage system and leave a placeholder file (e.g., a "stub" file) in the place of the archived file. When the archiving system later identifies an attempt to access the archived file (i.e., the placeholder file), the archiving system may retrieve the archived file from the archive storage system.

Unfortunately, migrating from an old archiving system to a new archiving system may be cumbersome and/or costly. Traditional archive migration techniques may entail a bulk restoration of archived files to a local primary storage system. However, the primary storage system may not have sufficient space to even temporarily hold the archived files. This scenario may be especially common given that one of the purposes of using an archiving system is to reduce local storage requirements. Furthermore, the resource overhead of restoring all of the archived files may interfere with primary applications. Additionally, these traditional techniques may result in downtime for the file system or, at minimum, temporary unavailability of the archived files. Accordingly, the instant disclosure identifies a need for additional and improved systems and methods for migrating archived files.

SUMMARY

As will be described in greater detail below, the instant disclosure generally relates to systems and methods for migrating archived files by bringing a new (target) archive system online while keeping the old (source) archive system online and individually restoring each archive files from the old archive system and directly archiving the file in the new archive system. In one example, a computer-implemented method for migrating archived files may include (1) identifying a file system including a plurality of placeholder files, the placeholder files referencing corresponding archived files stored on a first archival system, (2) identifying a request to migrate the archived files from the first archival system to a second archival system, (3) making the second archival system available to the file system for archival, and, while both the first archival system and the second archival system are available to the file system, (4) locating each placeholder file within the plurality of placeholder files on the file system, and, for each located placeholder file, (5) retrieving a corresponding archived file from the first archival system, and (6) archiving the corresponding archived file on the second archival system.

The computer-implemented method may retrieve the corresponding archived file with any of a variety of steps. In some examples, retrieving the corresponding archived file may include maintaining availability to the corresponding archived file on the file system while both the first archival system and the second archival system are available. In one example, retrieving the corresponding archived file may include removing the located placeholder file. In some examples, retrieving the corresponding archived file may include attempting to access the corresponding archived file via the located placeholder file on the file system. Additionally or alternatively, retrieving the corresponding archived file may include (1) identifying an application programming interface for the first archival system, (2) requesting, via the application programming interface, the corresponding archived file from the first archival system, and (3) receiving the corresponding archived file from the first archival system in response to requesting the corresponding archived file from the first archival system.

In some embodiments, archiving the corresponding archived file on the second archival system may include adding a new placeholder file referencing the corresponding archived file on the second archival system. In some examples, the computer-implemented method may also include (1) identifying at least one additional archived file stored on the first archival system but without a referencing placeholder file on the file system and (2) transmitting the additional archived file to the second archival system. In these examples, identifying the additional archived file may include (1) identifying a list of placeholder files within a directory on the file system and (2) determining that the additional archived file lacks the referencing placeholder file on the file system by determining that the additional archived file does not appear on the list of placeholder files but does appear in a corresponding directory in the first archival system. In some examples, the computer-implemented method may also include creating a new placeholder file for the additional archived file stored on the second archival system.

In one embodiment, a system for implementing the above-described method may include (1) an identification module programmed to (i) identify a file system including a plurality of placeholder files, the placeholder files referencing corresponding archived files stored on a first archival system and (ii) identify a request to migrate the archived files from the first archival system to a second archival system, (2) an availability module programmed to make the second archival system available to the file system for archival, (3) a location module programmed to, while both the first archival system and the second archival system are available to the file system, locate each placeholder file within the plurality of placeholder files on the file system, (4) a migration module programmed to, for each located placeholder file, (i) retrieve a corresponding archived file from the first archival system, and (ii) archive the corresponding archived file on the second archival system. The system may also include at least one processor configured to execute the identification module, the availability module, the location module, and the migration module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) identify a file system including a plurality of placeholder files, the placeholder files referencing corresponding archived files stored on a first archival system, (2) identify a request to migrate the archived files from the first archival system to a second archival system, (3) make the second archival system available to the file system for archival, and, while both the first archival system and the second archival system are available to the file system, (4) locate each placeholder file within the plurality of placeholder files on the file system, and, for each located placeholder file, (5) retrieve a corresponding archived file from the first archival system, and (6) archive the corresponding archived file on the second archival system.

As will be explained in greater detail below, by bringing a new archive system online while keeping the old archive system online and individually restoring each archive files from the old archive system and directly archiving the file in the new archive system, the systems and methods described herein may efficiently migrate files from one archive system to another without burdening local storage requirements and/or causing downtime for archived files and/or other files.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
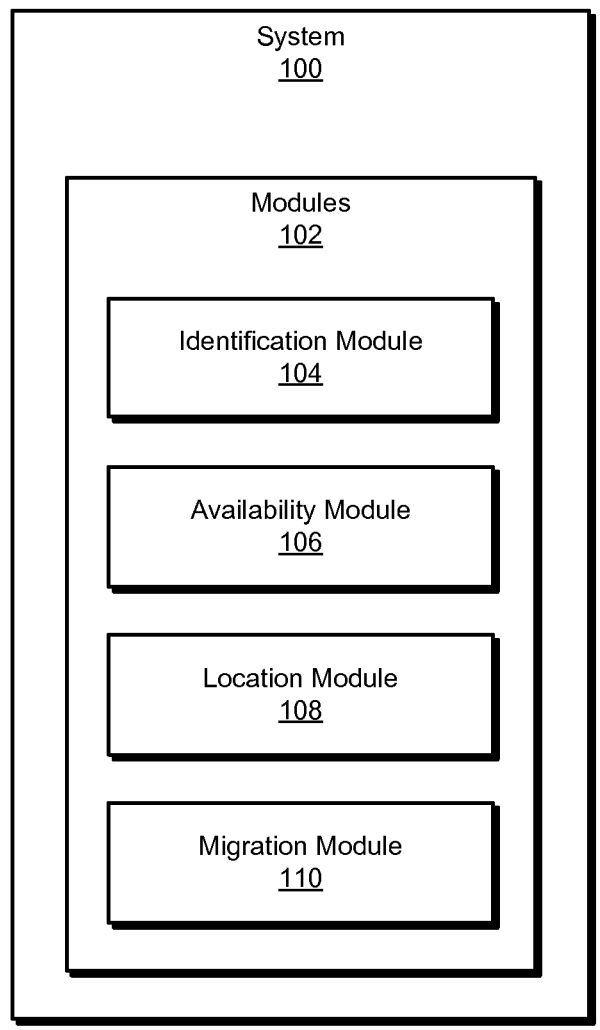
FIG. 1 is a block diagram of an exemplary system for migrating archived files.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 2:
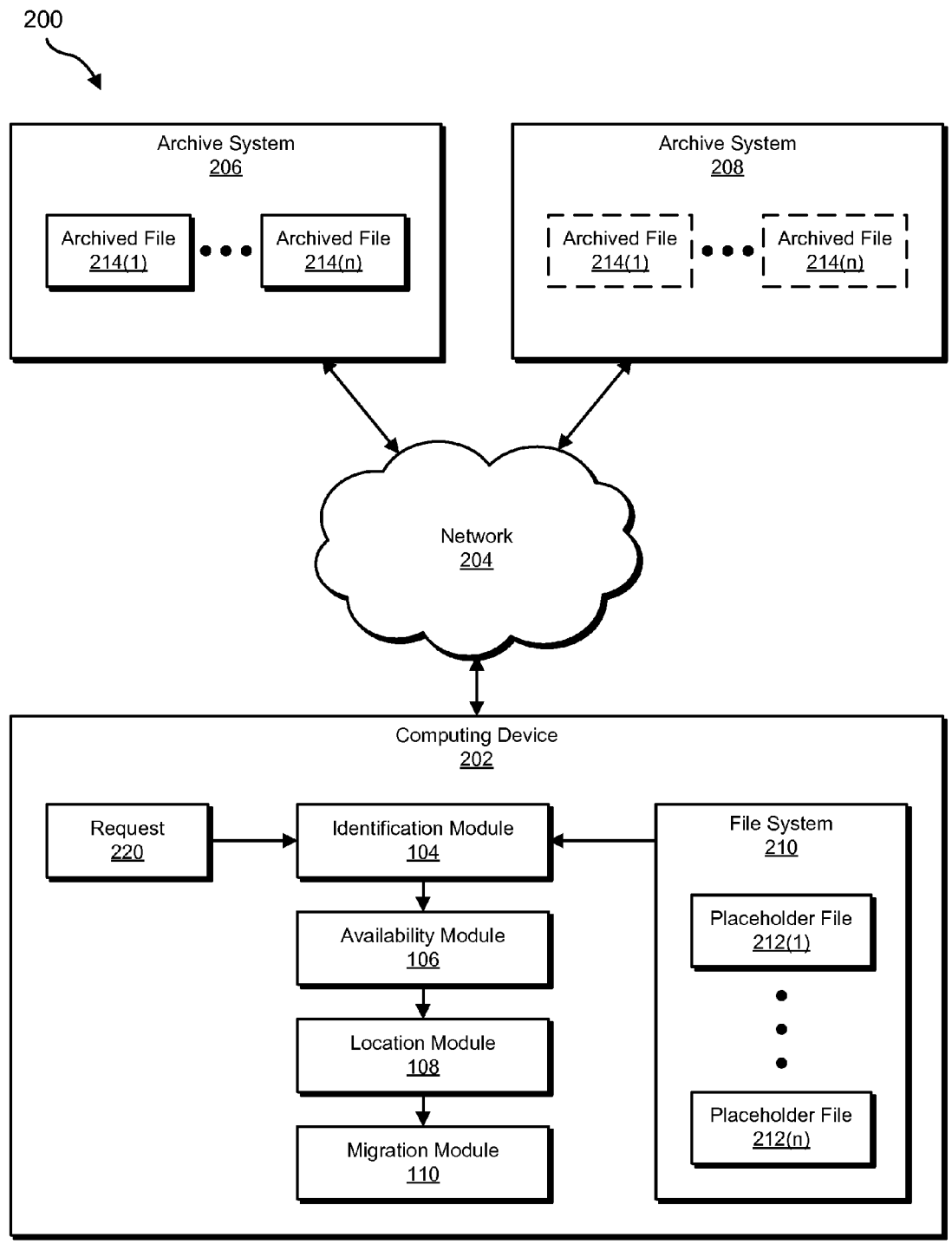
FIG. 2 is a block diagram of an exemplary system for migrating archived files.

The following will provide, with reference to FIGS. 1-2, detailed descriptions of exemplary systems for migrating archived files. Detailed descriptions of corresponding computer-implemented methods will also be provided in connection with FIG. 3. Detailed descriptions of a corresponding exemplary timeline will be provided in connection with FIG. 4. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for migrating archived files. As illustrated in this figure, exemplary system 100 may include one or more modules 102 for performing one or more tasks. For example, and as will be explained in greater detail below, exemplary system 100 may include an identification module 104 programmed to (1) identify a file system including a plurality of placeholder files that reference corresponding archived files stored on a first archival system and (2) identify a request to migrate the archived files from the first archival system to a second archival system. Exemplary system 100 may also include an availability module 106 programmed to make the second archival system available to the file system for archival. Exemplary system 100 may additionally include a location module 108 programmed to, while both the first archival system and the second archival system are available to the file system, locate each placeholder file within the plurality of placeholder files on the file system.

In addition, and as will be described in greater detail below, exemplary system 100 may include a migration module 110 programmed to, for each located placeholder file, (1) retrieve a corresponding archived file from the first archival system, and (2) archive the corresponding archived file on the second archival system. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202, archive system 206, and/or archive system 208), computing system 510 in FIG. 5, and/or portions of exemplary network architecture 600 in FIG. 6. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with an archive system 206 and an archive system 208 via a network 204.

In one embodiment, one or more of modules 102 from FIG. 1 may, when executed by at least one processor of computing device 202, facilitate computing device 202 in migrating archived files. For example, and as will be described in greater detail below, one or more of modules 102 may cause computing device 202 to (1) identify a file system (e.g., a file system 210) including a plurality of placeholder files (e.g., placeholder files 212(1)-(n)) that reference corresponding archived files (e.g., archived files 214(1)-(n)) stored on a first archival system (e.g., archive system 206), (2) identify a request (e.g., a request 220) to migrate the archived files from the first archival system to a second archival system (e.g., archive system 208), (3) make the second archival system available to the file system for archival (e.g., make archive system 208 available to file system 210 for archival), and, while both the first archival system and the second archival system are available to the file system (e.g., while both archive systems 206 and 208 are available to file system 210), (4) locate each placeholder file within the plurality of placeholder files on the file system (e.g., locate each of placeholder files 212(1)-(n) on file system 210), and, for each located placeholder file, (5) retrieve a corresponding archived file from the first archival system and (6) archive the corresponding archived file on the second archival system.

Computing device 202 generally represents any type or form of computing device capable of reading computer-executable instructions. Examples of computing device 202 include, without limitation, laptops, desktops, servers, cellular phones, personal digital assistants (PDAs), multimedia players, embedded systems, combinations of one or more of the same, exemplary computing system 510 in FIG. 5, or any other suitable computing device.

Archive systems 206 and 208 generally represent any type or form of computing device that is capable of storing, handling, and/or retrieving archived files. Examples of archive systems 206 and 208 include, without limitation, application servers and database servers configured to provide various database services and/or run certain software applications.

Network 204 generally represents any medium or architecture capable of facilitating communication or data transfer. Examples of network 204 include, without limitation, an intranet, a wide area network (WAN), a local area network (LAN), a storage area network (SAN), a personal area network (PAN), the Internet, power line communications (PLC), a cellular network (e.g., a GSM Network), exemplary network architecture 600 in FIG. 6, or the like. Network 204 may facilitate communication or data transfer using wireless or wired connections. In one embodiment, network 204 may facilitate communication between computing device 202 and archive systems 206 and 208.

Figure 3:
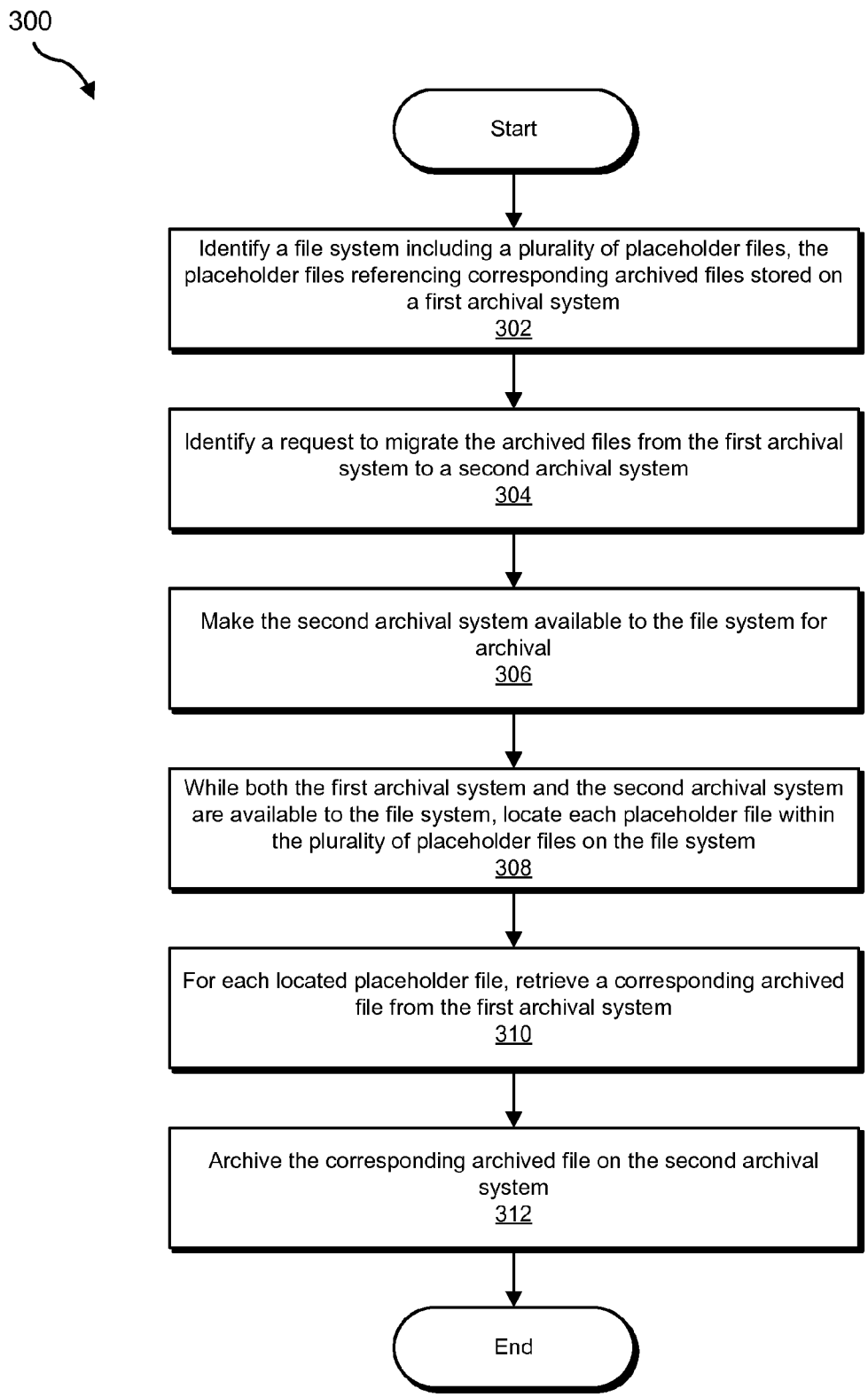
FIG. 3 is a flow diagram of an exemplary method for migrating archived files.

FIG. 3 is a flow diagram of an exemplary computer-implemented method 300 for migrating archived files. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 one or more of the systems described herein may identify a file system including a plurality of placeholder files that reference corresponding archived files stored on a first archival system. For example, at step 302 identification module 104 may, as part of computing device 202 in FIG. 2, identify file system 210 including placeholder files 212(1)-(n) referencing corresponding archived files 214(1)-(n) stored on archive system 206.

As used herein, the phrase "file system" may refer to any system for organizing and/or storing a collection of files and/or analogous data objects. In addition, the term "archiving," as used herein, generally refers to any type of data transfer (or data storage) technique that involves migrating data (e.g., a file) from at least one computing (or storage) device to at least one additional computing (or storage) device and replacing the migrated data with a placeholder (e.g., a reference, a stub, a shortcut, etc.). Accordingly, the phrase "placeholder file" as used herein may refer to any type of file and/or analogous data object left in place of migrated data. In some examples, the placeholder file may be smaller than the archived file it replaced. Additionally or alternatively, the size of the placeholder file may fall below a predetermined threshold (e.g., one kilobyte). In some examples, the placeholder file may use the same identifier as the archived file it replaced (e.g., the same file name). In additional examples, the placeholder file may contain information relating to the location of the archived file in an archive system (e.g., the alternate volume of data). An example of an archival system may include SYMANTEC ENTERPRISE VAULT.

Identification module 104 may identify the file system in any suitable manner. For example, identification module 104 may identify the file system by executing within an operating environment that uses the file system. Additionally or alternatively, identification module 104 may identify the file system by reading a configuration file and/or receiving a message identifying the file system.

Returning to FIG. 3, at step 304 one or more of the systems described herein may identify a request to migrate the archived files from the first archival system to a second archival system. For example, at step 304 identification module 104 may, as part of computing device 202 in FIG. 2, identify request 220 to migrate archived files 214(1)-(n) from archive system 206 to archive system 208.

In some examples, the second archival system may be incompatible with the first archival system. For example, the second archival system may be unable to communicate with the first archival system, may use a different and incompatible format of placeholder files, and/or may be unable to natively migrate archived files to the first archival system. In some examples, the request may specify, either explicitly or implicitly, that the second archival system is incompatible with the first archival system.

The request may include any of a variety of parameters. For example, the request may specify how much space is available within the file system for the purpose of migrating the archived files. Additionally or alternatively, the request may specify a maximum amount of resources (e.g., in terms of processing load, I/O load, memory load, etc.) to be used for migration. In some examples, the request may specify how many archived files may be stored on the file system at any given time during migration.

Identification module 104 may identify the request to migrate the archived files in any suitable context. For example, identification module 104 may receive the request from a user interface. Additionally or alternatively, identification module 104 may identify a scheduled migration task.

Figure 4:
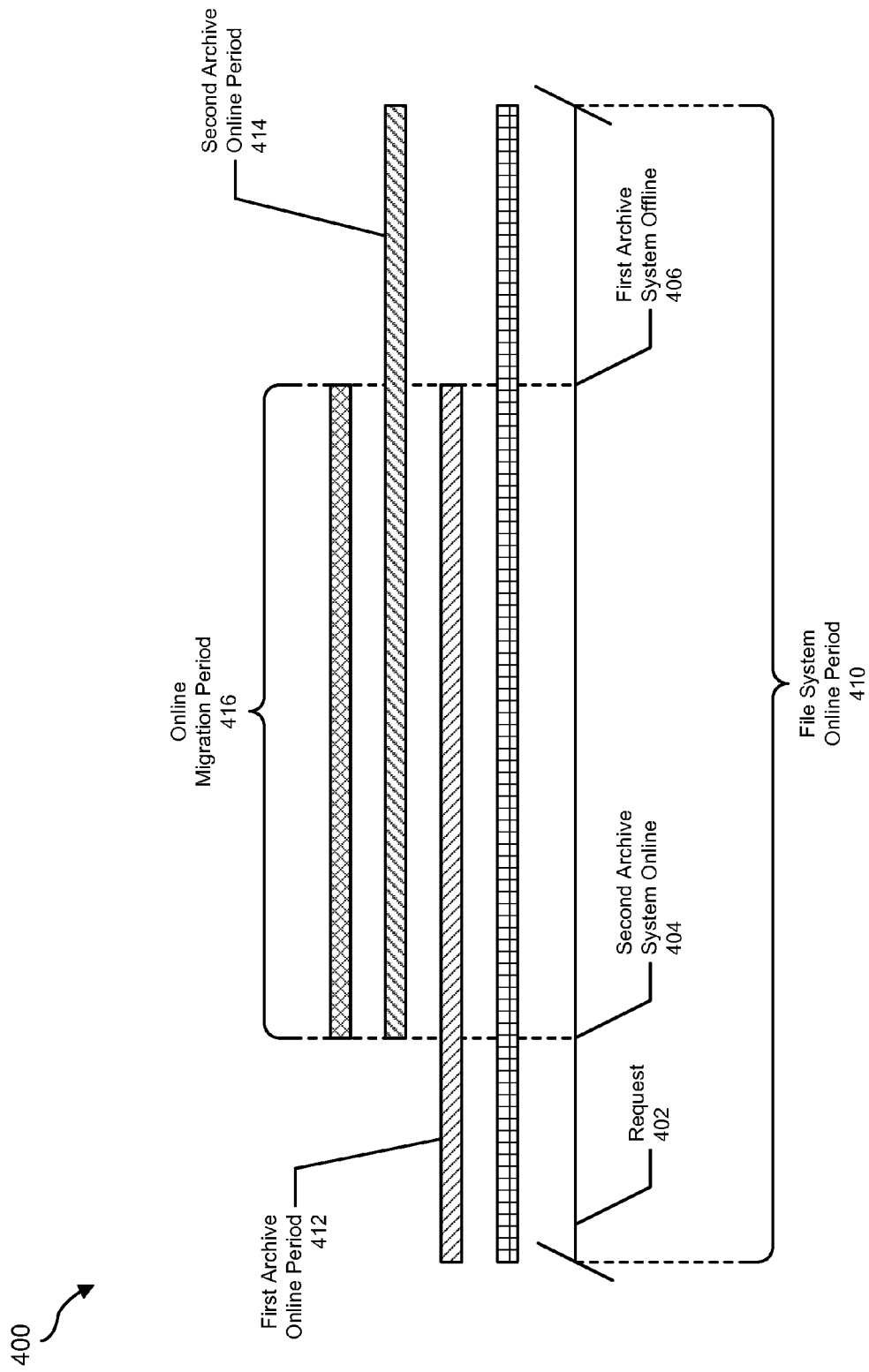
FIG. 4 is a diagram of an exemplary timeline for migrating archived files.

FIG. 4 illustrates an exemplary timeline 400 for migrating archived files. Using FIG. 4 as an example, at step 304 identification module 104 may identify a request 402.

Returning to FIG. 3, at step 306 one or more of the systems described herein may make the second archival system available to the file system for archival. For example, at step 306 availability module 106 may, as part of computing device 202 in FIG. 2, make archive system 208 available to file system 210 for archival.

Availability module 106 may perform step 306 in any suitable manner. For example, availability module 106 may configure the second archival system to operate with the file system. Additionally or alternatively, availability module 106 may configure the file system to operate with the second archival system (e.g., by installing and/or configuring a file system filter driver for operating with the second archival system). In some examples, availability module 106 may make the second archival system available to the file system for archival without making the first archival system unavailable for archival services.

Using FIG. 4 as an example, availability module 106 may make the second archival system available to the file system at a time second archive system online 404. Availability module 106 may thereby initiate a second archive online period 414.

Returning to FIG. 3, at step 308 one or more of the systems described herein may, while both the first archival system and the second archival system are available to the file system, locate each placeholder file within the plurality of placeholder files on the file system. For example, at step 308 location module 108 may, as part of computing device 202 in FIG. 2, locate each of placeholder files 212(1)-(n) on file system 210 while both archive system 206 and archive system 208 are available to file system 210.

Location module 108 may locate each placeholder file within the plurality of placeholder files in any of a variety of ways. For example, location module 108 may search the file system for placeholder files using a placeholder file format of the first archival system. In some examples, location module 108 may crawl through a directory tree of the file system (e.g., performing a depth-first or breadth-first search) to search for each placeholder file. Additionally or alternatively, location module 108 may identify a list and/or index of placeholder files corresponding to the first archival system. In some examples, location module 108 may identify one or more of the placeholder files within the plurality of placeholder files by identifying an attempt to access a corresponding archived file. For example, a user may attempt to access an archived file from the first archival system (via a corresponding placeholder file). In this example, location module 108 may identify the placeholder file by identifying the attempt to access the corresponding archived file (e.g., by monitoring the file system and observing that the archived file is being retrieved).

Using FIG. 4 as an example, location module 108 may perform step 308 during an intersection of a first archive online period 412 (e.g., while the first archival system is online) and the second archive online period 414 (e.g., while the second archival system is online). As shown in FIG. 4, at least a portion of this intersection may include an online migration period 416, during which the systems and methods described herein may identify and migrate archived files.

Returning to FIG. 3, at step 310 one or more of the systems described herein may, for each located placeholder file, retrieve a corresponding archived file from the first archival system. For example, at step 310 migration module 110 may, as part of computing device 202 in FIG. 2, retrieve archived file 214(1) corresponding to placeholder file 212(1) from archive system 206.

Migration module 110 may retrieve the corresponding archived file in any of a variety of conditions. For example, migration module 110 may maintain availability to the corresponding archived file on the file system while both the first archival system and the second archival system are available. For example, migration module 110 may retrieve the corresponding archived file directly to its original location within the file system. Migration module 110 may thereby enable applications to access the corresponding archived file as normal during migration. In some examples, migration module 110 may retrieve the corresponding archived file in response to determining that there are sufficient resources for retrieving the corresponding archived file. For example, migration module 110 may wait to retrieve the corresponding archived file until available space within the file system increases beyond a predetermined threshold, until the number of files in migration has dropped below a predetermined threshold (for example, migration module 110 may only perform a certain number of migrations at a time, or only one migration at a time), until the amount of data in migration has dropped below a predetermined threshold (e.g., 5 gigabytes), until a memory load has dropped below a predetermined threshold, etc.

In some examples, migration module 110 may also remove the located placeholder file. For example, migration module 110 may replace the located placeholder file with the corresponding archived file. In some examples, migration module 110 may retrieve the corresponding archived file simply by attempting to access the corresponding archived file via the located placeholder file on the file system. In this manner, migration module 110 may trigger the first archival system to return the archived file to the file system. In some examples, migration module 110 may retrieve the corresponding archived file by identifying a location of the corresponding archived file and retrieving the corresponding archived file from the specified location. In one example, the placeholder file may include an Internet shortcut. In this example, migration module 110 may extract a uniform resource locator from the Internet shortcut and fetch the corresponding archived file from the archive using the uniform resource locator.

In some examples, migration module 110 may attempt to retrieve the corresponding archived file using an application programming interface. For example, migration module 110 may identify an application programming interface for the first archival system. Migration module 110 may then request, via the application programming interface, the corresponding archived file from the first archival system. Migration module 110 may then receive the corresponding archived file from the first archival system in response to requesting the corresponding archived file from the first archival system. In some examples, migration module 110 may identify the application programming interface for the first archival system by referring to a data structure associating archival systems with application programming interfaces.

Using FIG. 4 as an example, migration module 110 may retrieve the corresponding archived file from the first archival system during online migration period 416.

Returning to FIG. 3, at step 312 one or more of the systems described herein may archive the corresponding archived file on the second archival system. For example, at step 312 migration module 110 may, as part of computing device 202 in FIG. 2, archive previously archived file 214(1) on from archive system 208.

Migration module 110 may perform step 312 in any suitable manner. For example, migration module 110 may simply submit the corresponding archived file to the second archival system. In some examples, migration module 110 may also add a new placeholder file referencing the corresponding archived file on the second archival system. Additionally or alternatively, the second archival system (and/or an agent of the second archival system) may automatically generate the new placeholder file as a part of archiving the corresponding archived file. In some examples, the new placeholder file may occupy the same location as the located placeholder file (e.g., the same file path and/or file name).

Using FIG. 4 as an example, migration module 110 may archive the corresponding archived file on the second archival system during the online migration period 416.

In some examples, migration module 110 may also migrate archived files not corresponding to located placeholder files. For example, migration module 110 may identify at least one additional archived file stored on the first archival system but without a referencing placeholder file on the file system. For example, a former placeholder file of the additional archived file may have expired. Migration module 110 may then transmit the additional archived file to the second archival system. Migration module 110 may identify the additional archived file in any of a variety of ways. For example, migration module 110 may identify a list of placeholder files within a directory on the file system. Migration module 110 may then determine that the additional archived file lacks the referencing placeholder file on the file system by determining that the additional archived file does not appear on the list of placeholder files but does appear in a corresponding directory in the first archival system. In some examples, migration module 110 may use an application programming interface to locate the additional archived file in the first archival system. Additionally or alternatively, migration module 110 may use the application programming interface to identify archival metadata corresponding with the additional archived file (e.g., a retention period to set for the additional archived file on the file system). In addition to transmitting the additional archived file to the second archival system, in some examples migration module 110 may create a new placeholder file for the additional archived file stored on the second archival system. After step 312, method 300 may terminate.

As explained above, by bringing a new archive system online while keeping the old archive system online and individually restoring each archive files from the old archive system and directly archiving the file in the new archive system, the systems and methods described herein may efficiently migrate files from one archive system to another without burdening local storage requirements and/or causing downtime for archived files and/or other files.

Figure 5:
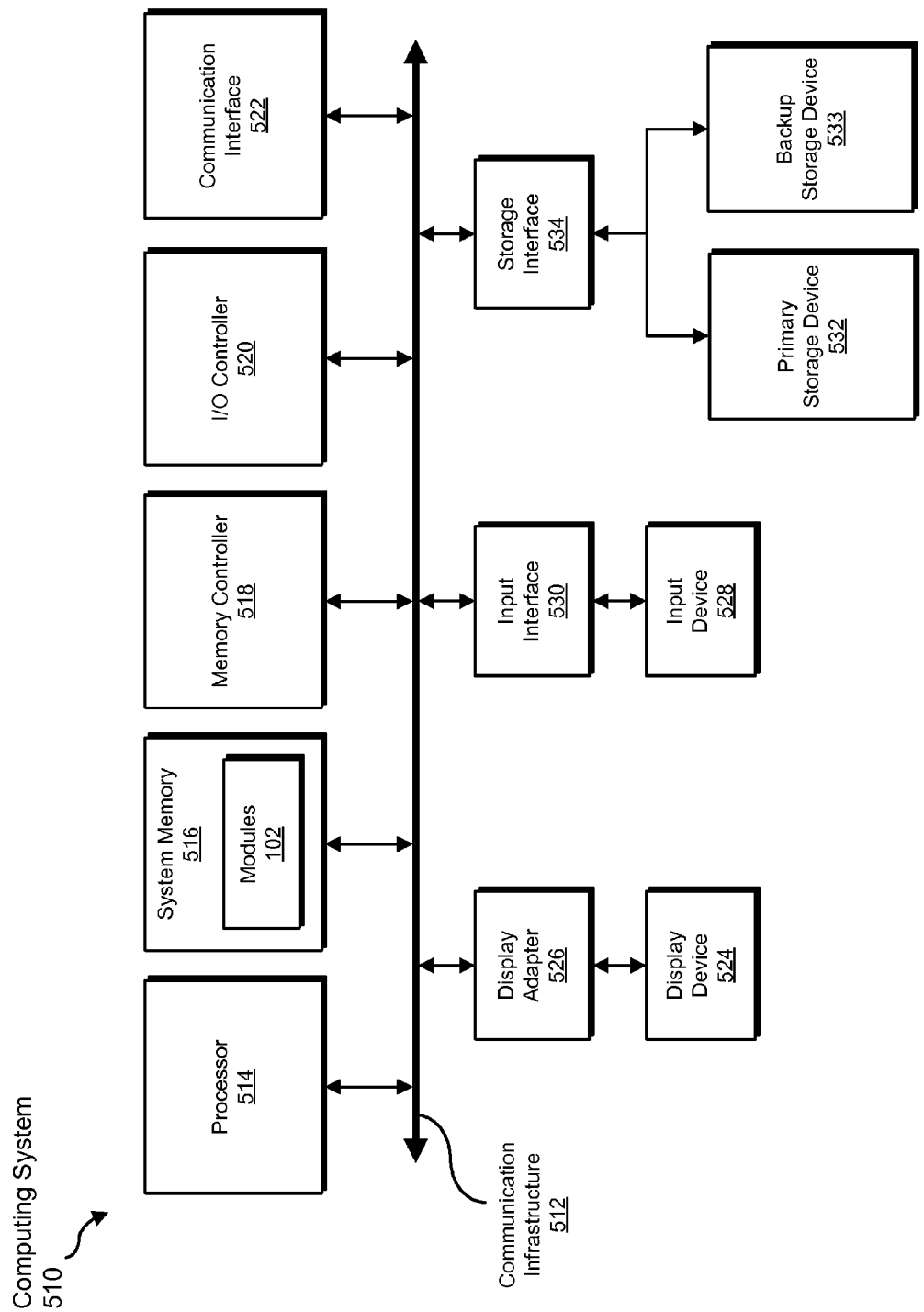
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the identifying, making, locating, retrieving, maintaining, removing, attempting, requesting, receiving, adding, determining, transmitting, and/or creating steps described herein. All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510.

Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 510. All or a portion of the computer program stored on the computer-readable-storage medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
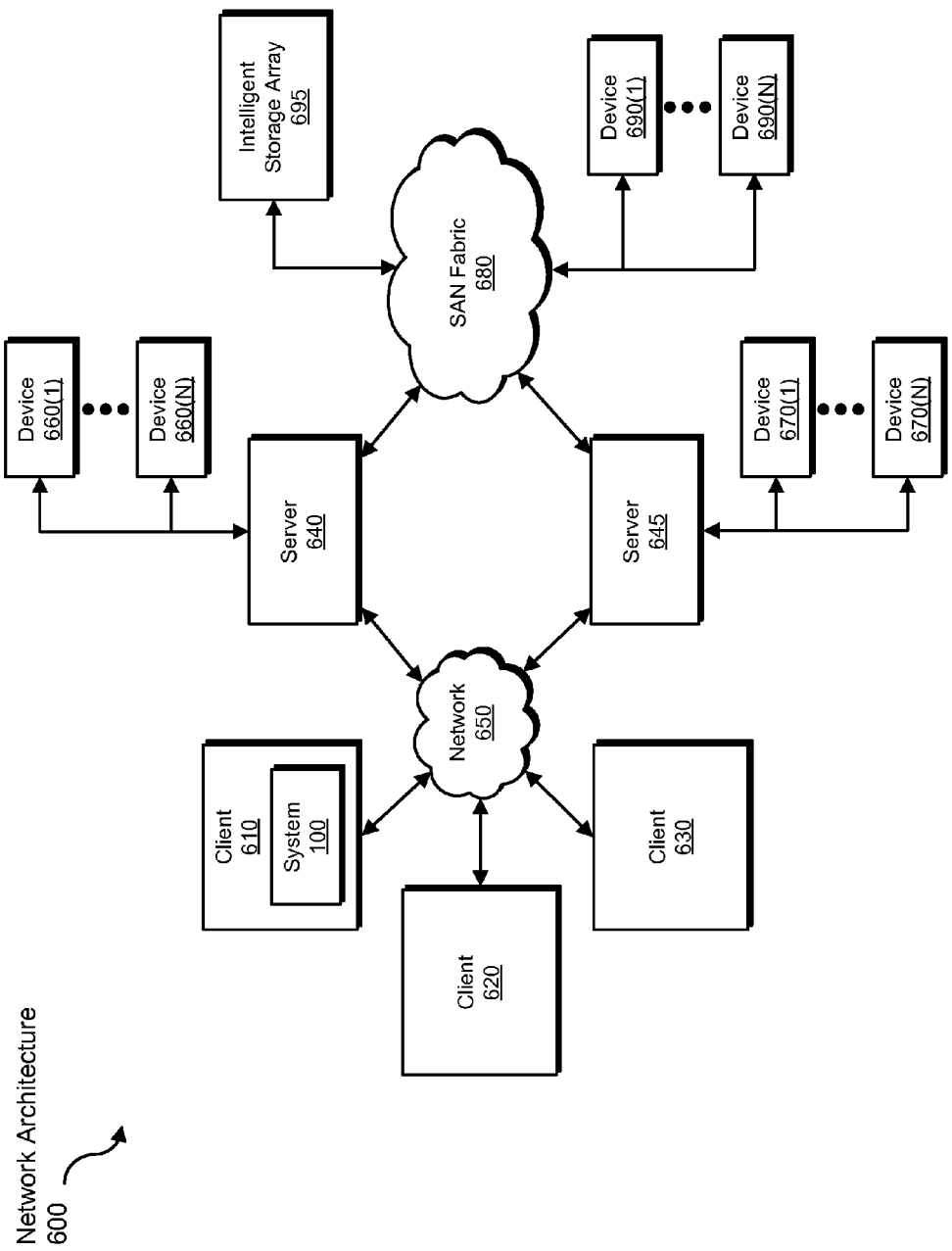
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the identifying, making, locating, retrieving, maintaining, removing, attempting, requesting, receiving, adding, determining, transmitting, and/or creating steps disclosed herein. All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for migrating archived files.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform a computing system into a system for migrating archived files.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for migrating archived files, at least a portion of the method being performed by a computing device comprising at least one processor, the method comprising:
   identifying a file system comprising a plurality of placeholder files, the placeholder files referencing corresponding archived files stored on a first archival system;
   identifying a request to migrate the archived files from the first archival system to a second archival system;
   making the second archival system available to the file system for archival;
   while both the first archival system and the second archival system are available to the file system:
      locating each placeholder file within the plurality of placeholder files on the file system;
      for each located placeholder file:
         retrieving a corresponding archived file from the first archival system;
         archiving the corresponding archived file on the second archival system.

2. The computer-implemented method of claim 1, wherein retrieving the corresponding archived file from the first archival system comprises removing the located placeholder file.

3. The computer-implemented method of claim 1, wherein archiving the corresponding archived file on the second archival system comprises adding a new placeholder file referencing the corresponding archived file on the second archival system.

4. The computer-implemented method of claim 1, wherein retrieving the corresponding archived file from the first archival system comprises attempting to access the corresponding archived file via the located placeholder file on the file system.

5. The computer-implemented method of claim 1, wherein retrieving the corresponding archived file and archiving the corresponding archived file comprises maintaining availability to the corresponding archived file on the file system while both the first archival system and the second archival system are available.

6. The computer-implemented method of claim 1, wherein retrieving the corresponding archived file from the first archival system comprises:
   identifying an application programming interface for the first archival system;
   requesting, via the application programming interface, the corresponding archived file from the first archival system;

receiving the corresponding archived file from the first archival system in response to requesting the corresponding archived file from the first archival system.

7. The computer-implemented method of claim 1, further comprising:
identifying at least one additional archived file stored on the first archival system but without a referencing placeholder file on the file system;
transmitting the additional archived file to the second archival system.

8. The computer-implemented method of claim 7, further comprising creating a new placeholder file for the additional archived file stored on the second archival system.

9. The computer-implemented method of claim 7, wherein identifying the additional archived file comprises:
identifying a list of placeholder files within a directory on the file system;
determining that the additional archived file lacks the referencing placeholder file on the file system by determining that the additional archived file does not appear on the list of placeholder files but does appear in a corresponding directory in the first archival system.

10. A system for migrating archived files, the system comprising:
an identification module programmed to:
identify a file system comprising a plurality of placeholder files, the placeholder files referencing corresponding archived files stored on a first archival system;
identify a request to migrate the archived files from the first archival system to a second archival system;
an availability module programmed to make the second archival system available to the file system for archival;
a location module programmed to, while both the first archival system and the second archival system are available to the file system, locate each placeholder file within the plurality of placeholder files on the file system;
a migration module programmed to, for each located placeholder file:
retrieve a corresponding archived file from the first archival system;
archive the corresponding archived file on the second archival system;
at least one hardware processor configured to execute the identification module, the availability module, the location module, and the migration module.

11. The system of claim 10, wherein the migration module is programmed to retrieve the corresponding archived file from the first archival system by removing the located placeholder file.

12. The system of claim 10, wherein the migration module is programmed to archive the corresponding archived file on the second archival system by adding a new placeholder file referencing the corresponding archived file on the second archival system.

13. The system of claim 10, wherein the migration module is programmed to retrieve the corresponding archived file from the first archival system by attempting to access the corresponding archived file via the located placeholder file on the file system.

14. The system of claim 10, wherein the migration module is programmed to retrieve the corresponding archived file and archive the corresponding archived file by maintaining availability to the corresponding archived file on the file system while both the first archival system and the second archival system are available.

15. The system of claim 10, wherein the migration module is programmed to retrieve the corresponding archived file from the first archival system by:
identifying an application programming interface for the first archival system;
requesting, via the application programming interface, the corresponding archived file from the first archival system;
receiving the corresponding archived file from the first archival system in response to requesting the corresponding archived file from the first archival system.

16. The system of claim 10, wherein the migration module is further programmed to:
identify at least one additional archived file stored on the first archival system but without a referencing placeholder file on the file system;
transmit the additional archived file to the second archival system.

17. The system of claim 16, wherein the migration module is further programmed to create a new placeholder file for the additional archived file stored on the second archival system.

18. The system of claim 16, wherein the migration module is programmed to identify the additional archived file by:
identifying a list of placeholder files within a directory on the file system;
determining that the additional archived file lacks the referencing placeholder file on the file system by determining that the additional archived file does not appear on the list of placeholder files but does appear in a corresponding directory in the first archival system.

19. A non-transitory computer-readable-storage medium comprising one or more computer-executable instructions that, when executed by at least one processor of a computing device, cause the computing device to:
identify a file system comprising a plurality of placeholder files, the placeholder files referencing corresponding archived files stored on a first archival system;
identify a request to migrate the archived files from the first archival system to a second archival system;
make the second archival system available to the file system for archival;
while both the first archival system and the second archival system are available to the file system:
locate each placeholder file within the plurality of placeholder files on the file system;
for each located placeholder file:
retrieve a corresponding archived file from the first archival system;
archive the corresponding archived file on the second archival system.

20. The non-transitory computer-readable medium of claim 19, wherein the one or more computer-executable instructions cause the computing device to remove the located placeholder file as a part of retrieving the corresponding archived file from the first archival system.

* * * * *